J. S. CUSHING.
WHEEL TIRE.
APPLICATION FILED JAN. 20, 1908.

943,816.

Patented Dec. 21, 1909.
2 SHEETS—SHEET 1.

Witnesses:
H. B. Davis
Cynthia Doyle

Inventor:
Josiah S. Cushing.
by Noyes & Harrison,
Attys.

J. S. CUSHING.
WHEEL TIRE.
APPLICATION FILED JAN. 20, 1908.

943,816.

Patented Dec. 21, 1909.
2 SHEETS—SHEET 2.

Witnesses:
H. B. Davis
H. A. Boyle

Inventor:
Josiah S. Cushing.
by Noyes & Harriman
Attys.

UNITED STATES PATENT OFFICE.

JOSIAH S. CUSHING, OF NORWOOD, MASSACHUSETTS.

WHEEL-TIRE.

943,816.

Specification of Letters Patent.

Patented Dec. 21, 1909.

Application filed January 20, 1908. Serial No. 411,567.

*To all whom it may concern:*

Be it known that I, JOSIAH S. CUSHING, of Norwood, county of Norfolk, State of Massachusetts, have invented an improvement in Wheel-Tires, of which the following is a specification.

This invention relates to wheel tires and is intended as an improvement upon the wheel tire shown in Letters Patent No. 897880, dated September 8, 1908, wherein a circular band surrounds the felly of the wheel at a distance therefrom which engages the interior of the tread portion only of the tire and transmits thereto the weight of the load, whereby that part of the tire which is out of contact with the ground supports the load and absorbs the vibrations, and means are provided for preventing lateral movement of said band and for guiding it, and also for preventing lateral movement of the tread portion of the tire and for guiding it.

My present invention has for its object to improve the construction of the tire in several particulars, whereby it is more resilient, may be more easily manufactured and assembled, and a specially constructed tire casing and felly are not required.

Figure 1:
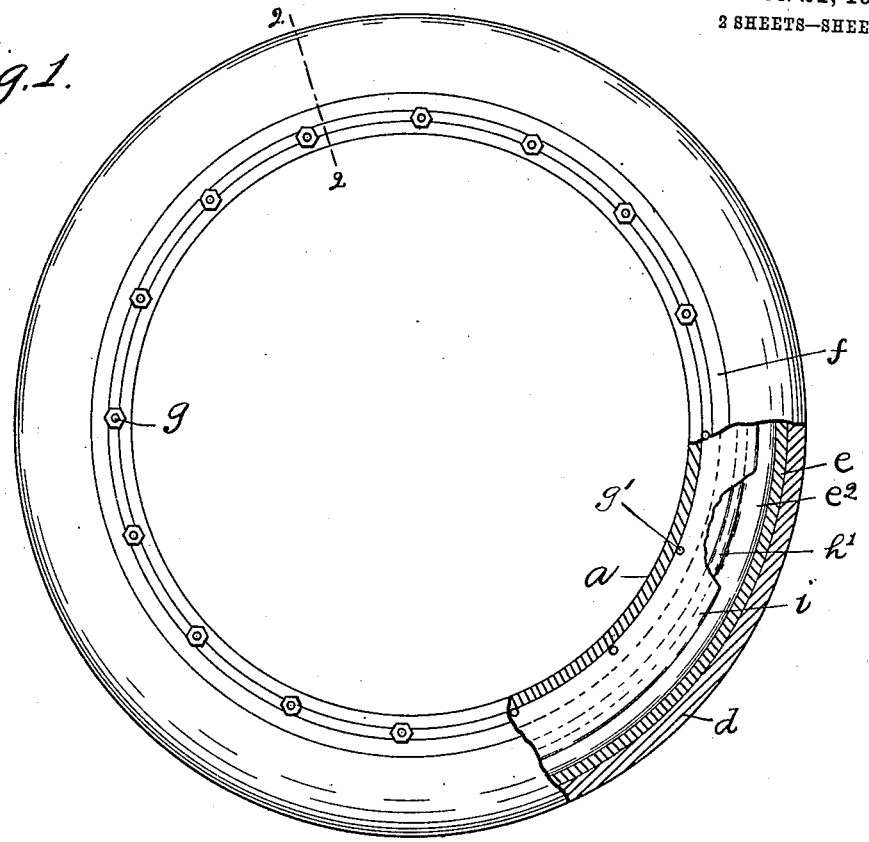
Figure 2:
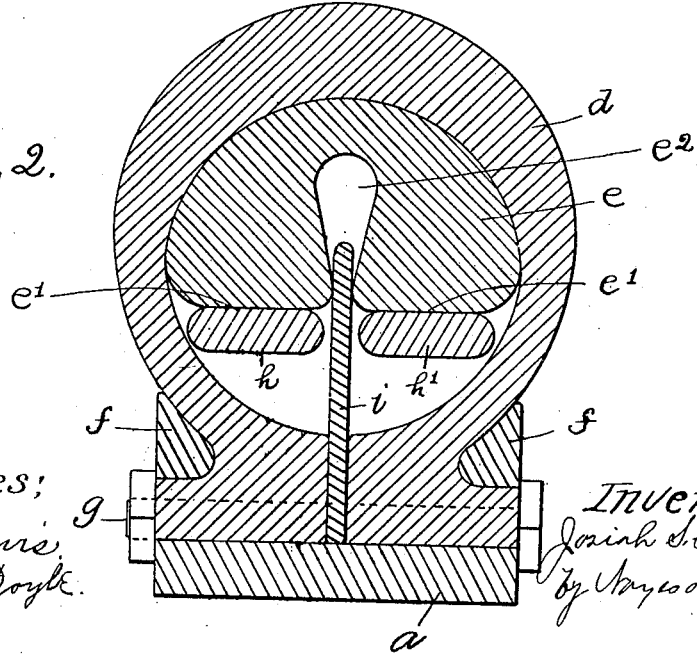
Figure 3:
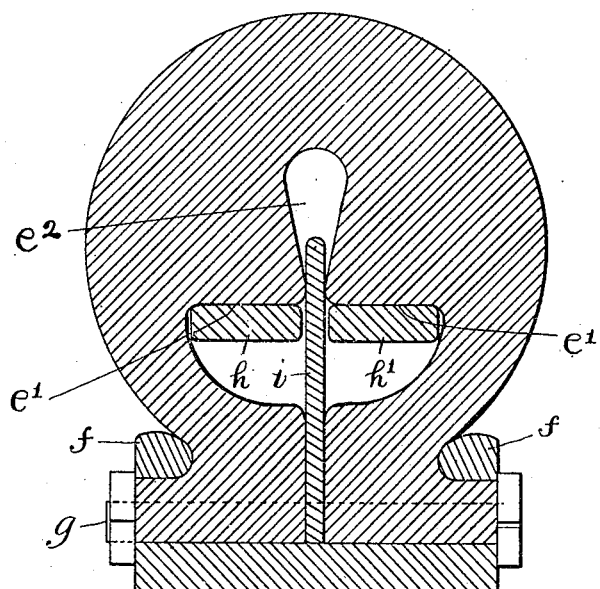

Figure 1 shows in side elevation and partial section a wheel-tire embodying this invention. Fig. 2 is an enlarged vertical section of the wheel-tire shown in Fig. 1, taken on the dotted line 2—2. Fig. 3 is a modification to be referred to.

$a$ represents the felly of any type of wheel. The flexible tire is connected to the felly. It is composed essentially of an outer casing $d$, having a yielding circular portion $e$, arranged within it at its tread side. These parts may be made separate as shown in Fig. 2, or integrally formed as shown in Fig. 3. When made separate they may be more easily made of different qualities of rubber with or without the interposition of textile material, and as I prefer to make the inner part quite yielding and the outer casing less yielding but more durable, to withstand the wear to which it is subjected, they will preferably be made separate.

The outer casing may be made of any suitable construction, and for the purpose of illustrating my invention one form only is herein shown. It is circularly formed in cross section, or made tubular, and its edges are thickened and arranged to be brought together and to be placed upon the felly of the wheel. The thickened edges of the casing are each provided externally with a V-shaped groove extending entirely around the tire, and in each groove a metal ring $f$ is placed, and bolts $g$ extend transversely across the lower flat faces of said edges, which enter grooves therein, the heads and nuts of which are made large enough to project over upon the rings $f$, $f$, and also over upon the edges of the felly $a$ to thereby secure the tubular casing to the felly. Such specific form of tubular casing, however, is not of my invention, and, as before stated, is herein shown merely for the purpose of illustrating my invention, and in lieu thereof any other form of outer casing may be employed. The circular portion $e$, which is arranged with the outer casing at its tread side, and which extends entirely around it, is formed semicircularly in cross-section to snugly fit the interior of the tubular casing, and it is also formed with a pair of flat engaging-faces, represented at $e'$, $e'$, which are arranged in the same plane and which extend entirely around it, and it has also a narrow recess, represented at $e^2$, which is arranged between said engaging-faces and which extends entirely around it. This recess is located approximately midway the width of the tire and in the vertical plane of the wheel. It is made quite deep and its bottom portion is or may be enlarged. The portions of the circular portion $e$ at opposite sides of the recess $e^2$ serve as radially and inwardly extending guiding means on the tire which engage guiding means on the felly to radially guide and laterally support the tire. Two circular bands $h$, $h'$, of metal or other material, made alike or substantially so, are contained in the tire. They are made quite thin to give to them the required resiliency, and they are made approximately as wide as the engaging-faces $e'$. They are formed with rounded edges and are made of a diameter sufficiently large to engage said faces $e'$, $e'$, and hence are located at a distance from the felly. They are made endless.

When pressure is applied to the tire, the tire, at the point of contact with the ground is compressed, and together with the bands is moved inward, but such compression and inward movement of the tire and bands is yieldingly resisted by the remaining portion of the tire which is out of contact with the ground. Hence the tread portion only of the tire, which is out of contact with the ground, serves as a yielding support to resist inward movement of that portion of the tire which is in contact with the ground, and consequently supports the load and absorbs the vibrations.

For the purpose of preventing lateral movement of the tire and for guiding it as it moves in a vertical plane, and also for preventing lateral movement of the circular bands and for guiding them, as they are moved in vertical planes, guiding means are arranged on the felly adapted to engage the tire-guiding means. Said felly-guiding means, as herein shown, consists of an annular disk $i$ arranged on the felly between the two bands $h$ and $h'$. The diameter of the center hole of the disk corresponds to the diameter of the felly so that said disk may be placed on the felly. The disk occupies a position between the two thickened edges of the tubular casing and is made large enough to project a short distance into the recess $e^2$ which serves as a guide therefor. The edge of the center hole of the disk is provided with grooves $g'$ which are arranged in alinement with the transverse grooves in the faces of the thickened edges of the casing, to receive the shanks of the bolts $g$. When the parts are assembled the disk $i$ is rigidly held by engagement therewith of the thickened edges of the tubular casing which are held assembled by the bolts $g$. Other means, however, may be provided for rigidly supporting the disk, the means herein shown being particularly applicable to the particular form of tubular casing which is herein shown for the purpose of illustrating my invention.

When pressure is applied to the tire and the part thereof which is in contact with the ground is moved inwardly toward the felly the disk more deeply enters the guiding recess $e^2$ of the tire and guides it in its movement in a vertical plane, and being located between the two bands $h$ and $h'$, guides them also in a vertical plane, and furthermore while thus radially guiding the tire and bands it also prevents lateral movement of said tire and band, with respect to the vertical plane of the wheel. Thus it will be observed that the circular bands transmit the weight of the load and the vibrations or shocks incident to the wheel passing over inequalities of the road to the tread portion only of the tire which is out of contact with the ground, so that the load will be supported and the vibrations or shocks absorbed by such portion of the tire, and that the tire and also the circular bands are held against lateral movement and also radially guided.

Having thus described my invention, what I claim as new and desire to secure by Letters Patent is:—

1. In a resilient wheel, a felly having vertical guiding means extending continuously therearound, a flexible tire attached to said felly having radially and inwardly extending guiding means therein, said tire-guiding means extending inwardly beyond and being at all times in engagement with said felly-guiding means, whereby the tire is radially guided and laterally supported, and continuous circular bands arranged within the tire at opposite sides of the felly-guiding means, which surround the felly, at a distance therefrom, and which transmit the weight of the load to the tread portion only of the tire, substantially as described.

2. In a resilient wheel, a felly having vertical guiding means extending continuously therearound, a flexible tire attached to said felly having radially and inwardly extending guiding means therein, said tire-guiding means extending inwardly beyond and being at all times in engagement with said felly-guiding means, whereby the tire is radially guided and laterally supported, and two continuous circular bands arranged within the tire at opposite sides of the felly-guiding means, which surround the felly, at a distance therefrom, and which transmit the weight of the load to the tread portion of the tire, said bands being of lesser diameter than the felly-guiding means and disposed adjacent thereto whereby they are radially guided and laterally supported, substantially as described.

3. In a resilient wheel, a felly having an annular disk extending continuously therearound, a flexible tire attached to said felly having an internal recess which continuously receives said disk, whereby the tire is radially guided and laterally supported, and two circular bands arranged within the tire, at opposite sides of said disk, which surround the felly, at a distance therefrom, and which transmit the weight of the load to the tread portion only of the tire, substantially as described.

4. In a resilient wheel, a felly having vertical guiding means extending continuously therearound, a flexible tire attached to said felly having radially and inwardly extending guiding means, which continuously engages said felly-guiding means, and also having a pair of flat engaging faces arranged at opposite sides of said felly-guiding means, and two circular bands in engagement with said flat faces which surround the felly, at a distance therefrom, and which transmit the weight of the load to the tread portion only of the tire, substantially as described.

5. In a resilient wheel, a felly having an annular disk extending continuously therearound, a flexible tire attached to said felly comprising an outer case and a circular portion arranged within it at its tread side, said circular portion having a recess which receives continuously said disk and also having a pair of flat engaging faces at opposite sides of said recess, and two circular bands engaging said flat faces which surround the felly, at a distance therefrom, and which transmit the weight of the load to the tread portion of the tire, substantially as described.

6. In a resilient wheel, a felly having an annular disk extending continuously therearound, means for holding said disk from movement with respect to the felly, a flexible tire attached to said felly having an internal recess which continuously receives said disk whereby the tire is radially guided and laterally supported, and circular bands arranged within the tire at opposite sides of said disk, which surround the felly, at a distance therefrom, and which transmit the weight of the load to the tread portion only of the tire, substantially as described.

In testimony whereof, I have signed my name to this specification, in the presence of two subscribing witnesses.

JOSIAH S. CUSHING.

Witnesses:
W. FRED. WIGMORE,
MARY E. McGRATH.